Feb. 3, 1970  H. M. RICHARDSON  3,493,009
HOSE REEL
Filed Sept. 6, 1967
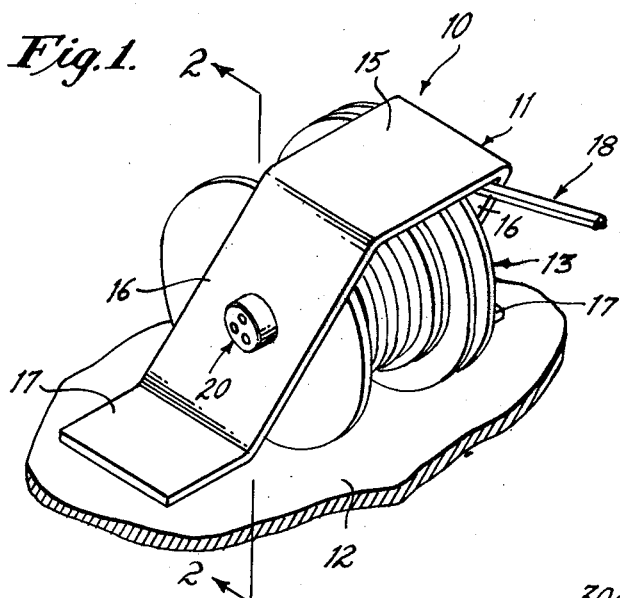
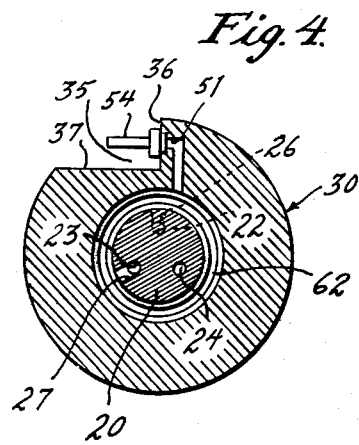
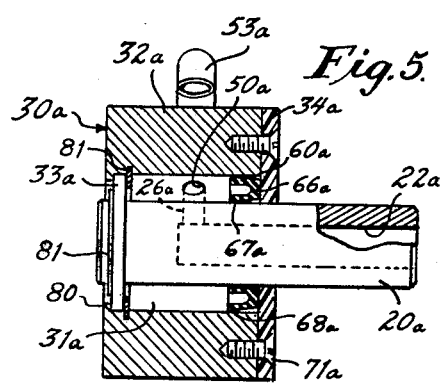
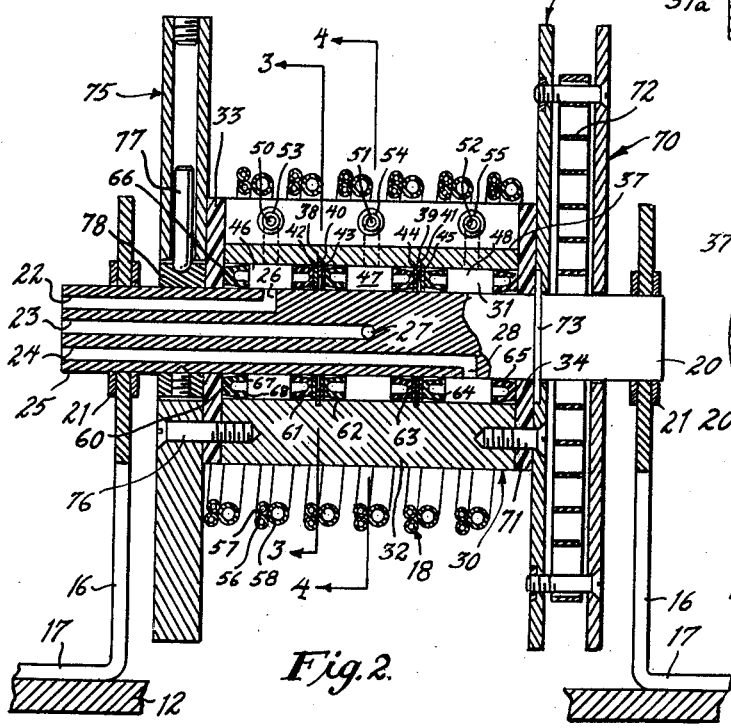
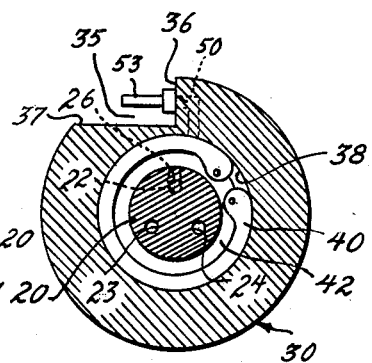
INVENTOR
HOWARD M. RICHARDSON
BY
Robert K. Youtie
ATTORNEY.

United States Patent Office 3,493,009
Patented Feb. 3, 1970

3,493,009
HOSE REEL
Howard M. Richardson, 2807 Benner St.,
Philadelphia, Pa. 19149
Continuation-in-part of application Ser. No. 450,020,
Apr. 22, 1965. This application Sept. 6, 1967, Ser.
No. 665,829
Int. Cl. B65h 75/46; A61c 17/00
U.S. Cl. 137—355.17         6 Claims

ABSTRACT OF THE DISCLOSURE

The instant invention, in essence, relates to a reel serving to mount a hose for extension and retraction thereof, the reel including a shaft having a bore, and a spool rotatably circumposed about the shaft and having an internal annular hollow combining with the shaft to define a fluid chamber, and wherein at least one annular seal is located in the chamber to seal an end thereof and carried by the spool for rotative sealing engagement with the shaft.

CROSS-REFERENCES TO RELATED APPLICATIONS

This application is a continuation-in-part of my copending patent application Ser. No. 450,020, filed Apr. 22, 1965, entitled "Hose Reel," and now Pat. No. 3,381,-704.

BACKGROUND OF THE INVENTION

The instant invention relates to hose reels of the same general type as disclosed in the above-referred-to copending patent application, wherein one or more fluids may be separately transmitted through hoses wound about the reel. While the device of the instant invention has been primarily developed and employed for use in the dental-equipment field, and will be illustrated and described hereinafter with particular reference thereto, it is appreciated that the instant invention is capable of many varied applications, all of which are intended to be comprehended herein.

SUMMARY

It is an important object of the present invention to provide a hose reel of the type described which is of greatly simplified construction over those of the prior art, affording the same ease and convenience of use as provided by the hose reel of said copending patent application, but with greater durability and a longer useful life, while effecting considerable savings in cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIGURE 1 is a top perspective view illustrating a hose reel constructed in accordance with the teachings of the present invention;

FIGURE 2 is a sectional elevational view taken generally along the line 2—2 of FIGURE 1;

FIGURE 3 is a transverse sectional view taken generally along the line 3—3 of FIGURE 2;

FIGURE 4 is a transverse section taken generally along the line 4—4 of FIGURE 2; and FIGURE 5 is a longitudinal sectional view showing a slightly modified embodiment of the present invention.

DESCRIPTION OF THE PREFERRED EMBODIMENTS

Referring now more particularly to the drawings, and specifically to FIGURES 1–4 thereof, a hose reel is there generally designated 10 and shown in FIGURE 1 as including a reel mount 11 mounted on a support or base 12. A reel, generally designated 13 is carried by the mount 11.

The mount is advantageously of a yoke or inverted U shaped configuration, including a top part 15, and a pair of legs 16 depending from opposite sides of the top part each being provided on its lower end with a respective foot 17 secured by any suitable means to the base 12. It will be observed that the legs 16 are disposed in substantial parallelism, extending in inclined or obliquely upward relation, so that the top part 15 is spaced horizontally from the feet 17 or lower ends of the legs. The reel 13 is located between the legs 16, generally beneath the top part 15, and carries hose means 18 wound about the reel and extending therefrom beneath the top part 15 As the top part 15 is offset to one side of the axis of reel 13 in the direction of withdrawal of hose 18, it will be appreciated that the hose is effectively guided for proper winding about the reel upon spring-biased rotation of the reel to wind the hose.

The reel 13 is shown in sections in FIGURES 2–4, and includes a shaft 20 extending laterally between and fixedly secured at its opposite ends in respective legs 16, by any suitable holding means, such as fasteners 21. The shaft 20 is provided with one or more longitudinal bores, being shown in FIGURE 2 as three in number, respectively designated 22, 23 and 24. The bores 22, 23 and 24 each extend longitudinally inwardly from one end portion 25 of the shaft 20 and terminate at longitudinally spaced locations within the shaft. There are additionally provided one or more transverse or radial bores, as at 26, 27 and 28 each extending radially inwardly through the shaft 20 and opening into a respective bore 22, 23 and 24, at the inner end thereof.

The reel 13 includes a spool, generally designated 30, rotatably circumposed about the shaft 20 and having an internal annular hollow 31 surrounding the shaft. More particularly, the spool 30 includes a generally cylindrical body 32 arranged in concentrically spaced relation about the shaft 20, and a pair of generally annular end walls 33 and 34 secured to opposite ends of the body or cylinder 32 and serving to close the ends of annular space 31. The end walls 33 and 34 may advantageously be fabricated of bearing material to rotatably support the spool 30 on the shaft 20. Thus, the cylinder or body 32 combines with the end walls 33 and 34, to define the spool 30 having an annular internal hollow; and further, the spool 30 combines with the shaft 20 to define of the hollow a closed annular chamber 31.

The cylinder or body 32 is provided externally with a recess 35 defined between a generally radial surface 36 and a generally chordal surface 37 intersecting with the radial surface. Also, the internal surface of the cylinder or body 32 may be provided with one or more internal annular grooves, being illustrated as two in number, as at 38 and 39, which are spaced approximately equidistant from each other and from respectively adjacent end walls 33 and 34. Engaged in the internal annular grooves 38 and 39 may be retaining members, such as the split-ring type of retainers, as at 40 and 41, respectively. A pair of generally annular washers 42 and 43 may be located on opposite sides of and adjacent to the retainer 38, and a similar pair of annular washers 44 and 45 may be located adjacent to and on opposite sides of the retainer 39.

Thus, the retainer 38 and its adjacent washers 42 and 43 define an annular partition in the chamber 31, as do the tainer 39 and its adjacent washers 44 and 45. The partition 38, 42 and 43, and the partition 39, 44 and 45 serve to subdivide the chamber 31 into a plurality of annular chambers 46, 47 and 48, respectively adjacent to and communicating with the transverse bores 26, 27 and 28.

In addition, the spool cylinder 32 is formed with a plurality of passageways, as at 50, 51 and 52 each communicating between a respective chamber 46, 47 and 48 with the external spool recess 35, as through the external spool surface 36. Carried by the spool surface 36 may be a plurality of tube connectors 53, 54 and 55 respectively communicating with passageways 50, 51 and 52 and adapted for connection to respective tubes 56, 57 and 58 of composite hose 18.

Interposed in each of the annular chambers 46, 47 and 48, on opposite sides of the respective communicating passageways, are a pair of generally annular seals. That is, a pair of seals 60 and 61 are located in the chamber 46, respectively adjacent to the end wall 33 and partition 38, 42 and 43, on opposite sides of the passageways 26 and 50. A similar pair of annular seals 62 and 63 are located in the chamber 47 on opposite sides of the passageways 27 and 51, respectively adjacent to the partition 40, 42 and 43, and the partition 41, 44 and 45. An additional pair of seals 64 and 65 are located in the chamber 48 on opposite sides of the passageways 28 and 52, respectively adjacent to the partition 41, 44 and 45, and the partition or end wall 34. The seals 60, 61, 62, 63, 64, and 65 may all be substantially identical, so that a detailed description of one will suffice. For example, the seal 60 may be integrally fabricated of a resiliently flexible material, such as rubber, or the like, being of generally constant cross section throughout, and of a U-shaped cross-sectional configuration, including a back or bight portion 66, and a pair of radially spaced inner and outer lips 67 and 68. The seal 60 is arranged with its bight or back portion 66 contiguous with the adjacent end wall or partition 43, and its lips 67 and 68 extending away from the adjacent wall or partition inwardly with respect to the chamber 46, the inner and outer lips being respectively engageable with the external surface of shaft 20 and internal surface of cylinder 32. Similarly, the seals 61-65 are of U-shaped cross section, each being arranged with its back or bight portion proximate to the adjacent partition or end wall and its lips extending inward with respect to the respective chamber for sealing engagement with the shaft 20 and cylinder 32.

The reel 13 further includes a double flange structure 70 rotatably circumposed about the shaft 20 and fixed to the spool 30 by any suitable means, such as fasteners 71. The double flange structure 70 may include a spring 72, which may have opposite ends anchored to the flange structure 70 and shaft 20 for resiliently urging the reel in one direction of rotation, to wind the hose 18 about the reel. Also, a retainer or locking ring 73 may be fixed on the shaft between the spool end wall 34 and double flange structure 70.

At the other end of the spool 30, adjacent to the spool end wall 33, there may be provided an additional flange structure 75, rotatable about the shaft 20 in fixed relation with the spool 30, as by fastener means 76. The flange structure 75 may include centrifugally operable latch means, such as a free radially slidable latch pin or bolt 77 in the flange structure 75 for movement into and out of latching engagement with a hub 78 fixed to the shaft. The latching means 77, 78 and spring-rewind means 72 may be as illustrated in my copending patent application, or other suitable equivalent conventional means.

In use, it will now be apparent that separate sources of fluid under pressure may be connected to respective longitudinal shaft bores 22, 23 and 24, for transmission from the respective bores, through associated chambers 46, 47 and 48, and thence through respective hose tubes 56, 57 and 58. The transmission of a selected fluid may occur with the spool 30 in any position of its rotation about shaft 20, or during rotation, as desired for convenience of the operator. The active seals 60-65, being under pressure in the respective chamber 46-48 are caused to have their lips distended in sealing engagement with the spool and shaft surfaces. By reason of the greater diameter of the internal spool surface relative to that of the shaft surface, and as the end walls 33 and 34 and partitions 40, 42 and 43; and 41, 44 and 45, all effectively rotate with the spool 30, it will be appreciated that relative sliding occurs appreciably only at the inner radial lip of each seal, to minimize wear of the seals.

In the embodiment shown in FIGURE 5, there is illustrated a spool 30a including a generally cylindrical body 32a having a pair of annular end walls 33a and 34a. The end wall 33a is retained internally within one end of the body 32a by an outer stop 80 and an inner retainer or split ring 81, while the end wall 34a may be secured by fasteners 71a. Thus, the spool 30a is provided with an internal annular recess 31a defined in the space between the body 32a and end walls 33a and 34a.

A shaft 20a may be fixedly mounted by any suitable means (not shown) and extends through the spool 32a to mount the latter for rotation about the shaft. More particularly, the shaft 20a is slidably engaged through the spool end walls 33a and 34a, and may be provided with a longitudinal bore 22a extending inward from one end of the shaft, and a transverse bore 26a extending from the inner end of longitudinal bore 22a generally radially to open externally of the shaft.

It will now be appreciated that the shaft 20a combines with the spool 30a to define an internal annular chamber of the recess 31a, and that the passageways 22a and 26a communicate with the chamber 31a. A retainer 81 of any suitable construction may be applied to the shaft 20a externally of the end wall 33a to prevent withdrawal through the latter end wall of the shaft.

Suitable passageway means may be provided transversely through the cylinder or body 32a of the spool 30a, as at 50a, and a tube connector 53a may be provided externally on the body 32a in communication with the passageway 50a for connection to a tube or hose.

Interiorly of the chamber 31a, on one side of the passageways 26a and 50a, may be provided an annular seal 60a of the same general structure as the seals 60-65 of the first-described embodiment. The seal 60a is thus of resiliently flexibility material, such as rubber, being of a constant generally U-shaped cross-sectional configuration throughout its circumference, including a bight or back portion 66a and radially spaced inner and outer circumferential lips 67a and 68a, the former being in sealing engagement with the shaft 20a, and the latter in sealing engagement with the internal surface of body 32a. As in the first-described embodiment, internal pressure within the chamber 31a insures effective bearing engagement of the seal 60a with the spool end wall 34a for seal rotation with the spool, so that sliding engagement occurs only between the inner seal lip 67a and shaft 20a for minimum wear. If desired, an additional seal may be provided in the embodiment of FIGURE 5 adjacent to the end wall 30a.

From the foregoing, it is seen that the present invention provides a hose-reel construction which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention.

What is claimed is:

1. A low-friction hose reel comprising a fixed shaft having a longitudinal bore, a cylinder in spaced relation about said shaft, a pair of axially spaced annular walls fixed on said cylinder in freely rotative engagement about said shaft and combining with said cylinder to define a spool, the space between said annular walls and cylinder defining an annular hollow and combining with said shaft to define a chamber extending about said shaft, said shaft having a transverse bore extending from said longitudinal bore into said chamber, an annular seal in said annular hollow carried by said spool on one side of said transverse bore for rotative sealing engagement with said shaft, a tube connector carried by said spool and communicating therethrough into said chamber, and hose means coiled about said spool and having one end connected to said tube connector, said seal comprising a resiliently flexible annular member of generally U-shaped cross-section having a pair of radially spaced annular lips extending inwardly of said chamber and respectively sealingly engageable with said spool and shaft.

2. A hose reel according to claim 1, said annular member being in engagement with one end of said chamber with its lips extending inwardly into said chamber, whereby fluid pressure in said chamber holds said annular member against said one chamber end for rotation with said spool and holds said lips in their respective sealing engagement with said spool and shaft, the absence of fluid pressure permitting relatively free spool rotation.

3. A hose reel according to claim 1, said spool having an external recess defined by a radially inwardly extending surface intersecting with a chordal surface, said tube connector being mounted in said external recess.

4. A hose reel according to claim 1, in combination with a second annular seal in said hollow carried by said spool on the other side of said transverse bore for rotative sealing engagement with said shaft, said first-and second-mentioned seals each comprising a resiliently flexible annular member of generally U-shaped cross section having a pair of radially spaced annular lips extending inwardly of said chamber and in respective sealing engagement with said spool and shaft.

5. A hose reel according to claim 4, said annular members each being in engagement with a respective end of said chamber with its lips extending inwardly into said chamber, whereby fluid pressure in said chamber holds said annular members against the adjacent chamber ends for rotation with said spool and holds said lips in their respective sealing engagement with said spool and shaft.

6. A hose reel according to claim 5, in combination with at least one annular partition extending about said shaft in said chamber spaced between the ends thereof, and a pair of additional resiliently flexible annular seal members of generally U-shaped cross section each having a pair of lips extending away from said partition and in respective sealing engagement with said shift and spool.

References Cited

UNITED STATES PATENTS

| | | | |
|---|---|---|---|
| 440,838 | 11/1890 | Chapman | 137—355.26 |
| 2,071,174 | 2/1937 | Parker | 137—355.17 |
| 2,458,343 | 1/1949 | Carleton | 285—190 XR |
| 2,627,074 | 2/1953 | Karp | 137—355.26 XR |
| 2,640,724 | 6/1953 | Sanders et al. | 137—355.17 XR |
| 2,768,843 | 10/1956 | Zeilman | 285—190 XR |
| 2,948,554 | 8/1960 | Mahand | 277—205 XR |
| 3,186,723 | 6/1965 | Wagner | 277—59 |
| 3,384,108 | 5/1968 | Kern | 137—355.17 |

FOREIGN PATENTS

| | | |
|---|---|---|
| 529,561 | 8/1956 | Canada. |

SAMUEL SCOTT, Primary Examiner